Patented Jan. 18, 1938

2,106,039

UNITED STATES PATENT OFFICE 2,106,039

CONDENSER DIELECTRIC MATERIAL

Moyer M. Safford, Schenectady, N. Y., assignor to General Electric Company, a corporation of New York No Drawing. Application December 12, 1935, Serial No. 54,088

9 Claims. (Cl. 154—2.6)

The present invention relates to solid condenser dielectric material, and more particularly to an improved condenser dielectric material comprising titanium dioxide heat treated at a calcination temperature.

The capacity of a condenser, as is well known, is directly proportional to the area of its plates, inversely proportional to the distance separating them, and directly proportional to the dielectric constant of the material between the plates. By the use of dielectric material having a high dielectric constant it is possible to increase the electrical size of the condenser and at the same time maintain the advantage of small physical dimensions. The dielectric material to be used must necessarily have a low electrical loss or power factor.

Heretofore, condensers also known as capacitors, have been made with dielectric materials such as paper saturated with various solid or liquid organic materials. To improve the dielectric properties of the condenser, mixtures of organic liquids and inorganic powders have been proposed. In Patent 1,769,874—Boyer, for example, the use of titanium oxide powder saturated with nitrobenzene is suggested.

Although the condenser dielectric materials previously proposed may be used to advantage for certain electrical applications, the need for a still further improved solid condenser dielectric material possessing a high dielectric constant and low power factor has long been recognized in the electrical industry.

It is accordingly a principal object of my invention to provide a condenser dielectric material having a high dielectric constant and a low power factor.

The commercial titanium dioxide ($TiO_2$), obtained by purification of rutile, is unsuited for condenser dielectric material as it possesses a low dielectric constant and a high power factor. This commercial product is white in color and is an amorphous powder.

I have discovered that an inorganic substance consisting of titanium dioxide which has been heat-treated or calcined may be used advantageously for condenser dielectric material. During the heat treatment some crystals of titanium dioxide are formed, the material changes from a white to a bluish grey, then to a light straw color, and the dielectric constant increases and the power factor decreases in value.

In accordance with my invention commercial titanium dioxide is mixed, for example, in a dough or putty mixer with a small amount, say, about 1% of a binder that may consist, for example, of 1% starch, 1% ammonia and 98% water. After thorough mixing, the doughy mass is pressed into cakes about 1 inch thick and 4 inches in diameter. The pressed cakes are stacked in a crucible composed of any suitable material such as alundum, and are subjected to a heat or calcination treatment in a gas furnace for several hours at a high temperature, for example, about 1350° C. After the cakes are cooled they are crushed and sifted through a fine sieve, for example, one of about 300 mesh. The resulting powder, which is bluish grey in color, shows upon microscopic examination the presence of crystalline titanium dioxide.

The heat-treated powder is again mixed with a binder, pressed into cakes, subjected to a second heat treatment at 1350° C. for several hours, crushed and sifted in manner similar to that followed in the initial treatment of the commercial titanium dioxide. The powder after the second firing is light straw in color and upon examination shows crystals of titanium dioxide of increased size.

Prolonged heat treatment during the first firing does not increase the size of the crystals. Likewise, repeated heat treatments of the powder after the second firing do not increase the size of the crystals.

The following table shows the dielectric constants and power factors of commercial titanium dioxide, of commercial titanium dioxide after one firing and of commercial titanium dioxide after two firings. The electrical tests were made by molding the powders with 10% shellac in discs ⅛ inch thick and 4 inches in diameter and measuring the electrical characteristics at 1000 cycles.

| Material | Color | Dielectric constant | Power factor |
|---|---|---|---|
| Commercial $TiO_2$ | White | 6–12 | 12–16 |
| Commercial $TiO_2$, fired once at 1350° C. | Bluish grey | 15–22 | 6–8 |
| Commercial $TiO_2$ fired twice at 1350° C. | Light straw | 22–40 | 2–3 |

Various methods of using the heat-treated titanium dioxide may be employed. For example, 5% to 10% of the fired powder may be incorporated into paper at the time the paper is being made. Dielectric sheets may also be prepared by compounding the fired powder with synthetic resinous compositions such, for example, as alkyd resins.

The alkyd resins, as is well known, comprise those complexes resulting from the interaction of a polyhydric alcohol, such as glycerine, and a polybasic acid, such as phthalic acid or its anhydride, with or without other reacting ingredients. A condenser dielectric sheet may be prepared, for example, by compounding flexible alkyd resin compositions, described in Kienle and Rohlfs Patent No. 1,897,260, with about 80% fired titanium dioxide. The resin and the powder are thoroughly mixed, rolled in the usual manner into a thin sheet, for instance, a sheet 0.015 inch in thickness, pressed and cured. Other materials such as synthetic rubbers sold on the market under the trade names of Du Prene and Thiokol, or plasticized polymerized vinyl chloride, may be used in place of the alkyd resin.

Although I have given specific examples for the incorporation of the heat treated titanium dioxide into dielectric sheets I do not wish to be limited thereto. My improved dielectric material is suitable for all types of application where a solid material combining a high dielectric constant and low power factor is desired.

What I claim as new and desire to secure by Letters Patent of the United States is:

1. A condenser dielectric comprising an inorganic substance consisting of calcined titanium dioxide of such electrical characteristics that when mixed with 10 per cent shellac and molded into a disc $\frac{1}{8}$ inch thick and 4 inches in diameter and its electrical properties measured at 1000 cycles, such disc possesses a power factor of not more than 3 and a dielectric constant of at least 22.

2. A dielectric material comprising an inorganic substance consisting of titanium dioxide calcined at a temperature of at least about 1350° C.

3. A condenser dielectric comprising at least 5 per cent of an inorganic substance consisting of titanium dioxide calcined at a temperature of at least about 1350° C.

4. A dielectric material comprising a sheet of resinous material containing about 80 per cent of an inorganic substance consisting of titanium dioxide calcined at a temperature of at least about 1350° C.

5. A condenser dielectric comprising a sheet of flexible alkyd resin containing about 80 per cent of an inorganic substance consisting of titanium dioxide calcined at a temperature of at least about 1350° C.

6. A condenser dielectric comprising an inorganic substance consisting of the resultant of subjecting titanium dioxide to two successive calcination treatments at a temperature of approximately 1350° C.

7. A condenser dielectric comprising an inorganic substance consisting of the resultant of subjecting titanium dioxide to at least two calcination treatments at approximately 1350° C.

8. A dielectric material comprising a dielectric sheet material having incorporated therein an inorganic substance consisting substantially of crystalline titanium dioxide produced by calcining amorphous titanium dioxide at a temperature of at least about 1350° C.

9. A dielectric material comprising paper having incorporated therein an inorganic substance consisting substantially of crystalline titanium dioxide produced by calcining amorphous titanium dioxide at a temperature of at least about 1350° C.

MOYER M. SAFFORD.